United States Patent [19]

Pfalzgraf et al.

[11] Patent Number: 4,505,357

[45] Date of Patent: Mar. 19, 1985

[54] DEVICE FOR ELECTRICALLY CONTROLLING THE SPEED OF TRAVEL

[75] Inventors: Manfred Pfalzgraf, Frankfurt am Main; Kunibert Graf, Kelkheim, both of Fed. Rep. of Germany

[73] Assignee: VDO Adolf Schindling AG, Frankfurt am Main, Fed. Rep. of Germany

[21] Appl. No.: 520,045

[22] Filed: Aug. 4, 1983

[30] Foreign Application Priority Data

Oct. 15, 1982 [DE] Fed. Rep. of Germany ....... 3238218

[51] Int. Cl.³ .............................................. F02D 33/00
[52] U.S. Cl. .................................... 180/335; 123/361; 123/397
[58] Field of Search ................................ 180/335, 271; 246/182 R; 73/508; 340/62; 123/399, 397, 361

[56] References Cited

U.S. PATENT DOCUMENTS

| | | | |
|---|---|---|---|
| 2,192,714 | 3/1940 | Norman et al. | 180/335 |
| 2,825,418 | 3/1958 | Kershman | 180/335 |
| 4,305,359 | 12/1981 | Mann et al. | 123/399 |
| 4,419,973 | 12/1983 | Collonia | 123/397 |
| 4,430,975 | 2/1984 | Ishida et al. | 123/399 |
| 4,445,603 | 5/1984 | Filsinger | 123/361 |

*Primary Examiner*—Richard A. Bertsch
*Attorney, Agent, or Firm*—Martin A. Farber

[57] ABSTRACT

A device for electrically controlling the speed of travel of an automotive vehicle, having a desired-value transmitter 2 which can be displaced by a gas pedal and whose output signal can act on a setting member 5 of a throttle valve 7. A pedal contact 14 can be acted on by the gas pedal 1 in such a manner that when the gas pedal 1 is moved out of the idling position, energy can be supplied to a unit which controls the speed of rotation of the engine. In series with the pedal contact 14 there is arranged a safety contact 15 which can be closed by mechanical actuation of the gas pedal 1 out of its idling position.

8 Claims, 1 Drawing Figure

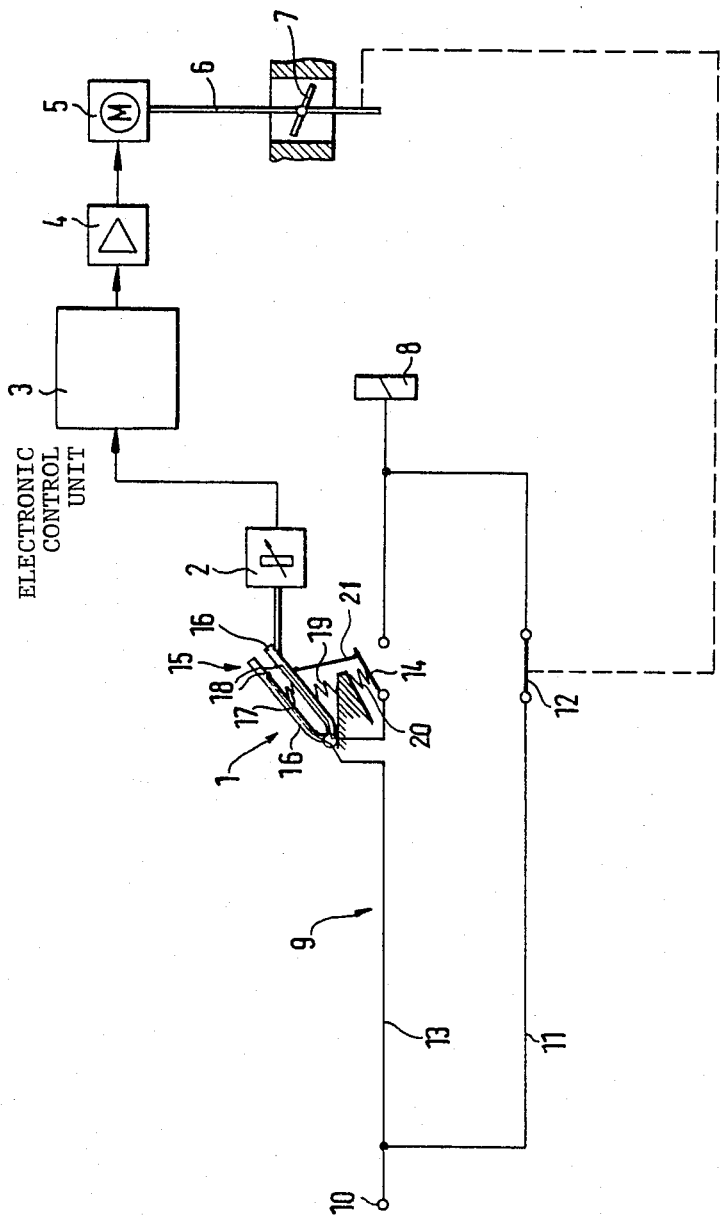

DEVICE FOR ELECTRICALLY CONTROLLING THE SPEED OF TRAVEL

The present invention relates to a device for electrically controlling the speed of travel of an automotive vehicle, having a desired-value transmitter, which can be displaced by a gas pedal and whose output signal can act on a setting member of an element which controls the fuel-air mixture of an internal combustion engine and having a pedal contact which can be acted on by the gas pedal in such a manner that when the gas pedal is moved out of the idling position, energy can be supplied to a unit which controls the speed of rotation of the motor.

In such known devices, the pedal contact provides assurance that the supply of energy, for instance to the fuel pump, is acted on in the idle position of the gas pedal in such a manner as to reduce the speed of rotation of the engine. In case of a defect in the device this serves, in principle, to avoid an increase in the speed of rotation and thus dangerous driving situations. For this purpose, however, it is necessary that the gas pedal be in its idle position. If the gas pedal is in a position which has been moved out of the idle position such assurance is not present. This may be the case, for instance, if the spring which moves the gas pedal into its idle position is defective. In such case, the speed of rotation of the engine may increase even though the gas pedal is not actuated.

The object of the present invention is, therefore, to create a device of the above type with which the assurance provided in operation against an unintended increase in the speed of the engine is substantially increased.

This object is achieved according to the invention in the manner that a safety contact (15) which can be closed by mechanical actuation of the gas pedal (1) out of its idle position is arranged in series with the pedal contact (14). Such mechanical actuation of the gas pedal is effected by the driver depressing the gas pedal so that the unit which controls the speed of the engine can be displaced in the direction of an increase in the speed of rotation of the engine only when the gas pedal is actually depressed by the driver. Displacement of the gas pedal from its idle position without such closing of the safety contact has no effect on the speed of rotation of the motor. Thus, for instance, the breaking of the return spring for the gas pedal cannot lead to a critical situation.

In order to assure the open position of the safety contact when the gas pedal is not actuated, the safety contact (15) can be adapted to close against a given spring force.

The pedal contact (14) and the safety contact (15) can be arranged, for instance, in a line which connects a source of current (10) to a fuel pump and/or to the ignition circuit, so that an open pedal contact or an open safety contact leads to the disconnecting of the gasoline pump or of the ignition, and thus to a reduction in the speed of rotation of the engine.

If a setting-member contact (12), which is closed in the idle position of the element controlling the fuel-air mixture and is open in the gas position of said element is arranged in parallel to the pedal contact (14) and to the safety contact (15) then idling of the motor is possible when the pedal contact or the safety contact is open. If, however, with this condition of operation, the setting member should move out of its idle position due to a defect, then the unit which controls the speed of rotation of the engine will be acted on so as to reduce the speed of the engine as a result of the opening of the setting-member contact.

In one advantageous, compact development, the safety contact (15) can be arranged in the gas pedal (1). This is possible with the gas pedal (1) consisting of two pedal parts (16) which are pivotable relative to each other against a spring biasing force, each of the parts, facing each other, carrying one contact (18) of the safety contact (15). The contacts (18) are adapted to be conductively connected to each other upon relative movement towards each other, overcoming the spring biasing force.

One preferred embodiment of the invention is represented in the sole FIGURE of the drawing by a circuit diagram and will be described in further detail below.

The drawing shows a device which has a gas pedal 1 which can be moved into its idle position by a compression spring 19 and by which the desired-value transmitter 2, developed as a potentiometer, can be displaced. The output signal from the desired-value transmitter 2 is fed to an electronic control unit 3 which, via an amplifier 4, controls a setting member 5, developed as servomotor, in accordance with the displacement of the gas pedal 1. The element developed as throttle valve 7 of an internal combustion engine and which controls the fuel-/air mixture is displaceable by a setting rod 6 of the setting member 5.

A fuel-pump relay 8 of a fuel pump (not shown) of the internal combustion engine can be connected to a source of current 10 by a parallel circuit 9.

In the one branch 11 of the parallel circuit 9 there is provided a setting-member contact 12 which can be so controlled by the setting member 5 that it is closed in the idle position of the setting member 5 and open in the gas position of the setting member.

In the second branch 13 of the parallel circuit 9 a pedal contact contact 14 and a safety contact 15 are arranged in series with each other.

The pedal contact 14 can be controlled by the gas pedal 1 in such a manner that it is opened in the idle position of the gas pedal 1 and closed in the gas position of the gas pedal 1.

The safety contact 15 is arranged in the gas pedal 1 itself. This gas pedal consists of two pedal parts 16 which are swingable also relative to each other around the same axis as the entire gas pedal 1. The pedal parts 16 are forced away from each other into the position shown in the drawing by a spring 17 when the gas pedal 1 is not actuated. In this way the contacts 18 of the safety contact 15 which are arranged opposite each other in the respective pedal parts 16 are out of contact with each other.

When the device is intact, the individual contacts are, when idling, in the position shown. If the gas pedal 1 is moved by the driver out of the idle position, and thus depressed by his foot, the pedal parts 16 are first of all pressed together in opposition to the force of the spring 17, as a result of which the contacts 18 make contact with each other and the safety contact 15 is thus closed.

Upon further depression of the gas pedal 1, the pedal contact 14 is also closed and the desired-value transmitter 2 is displaced. Its output signal, which is processed in the electronic control unit 3, leads to a displacement of the setting member 5 out of its idle position, as a result of which the setting member contact 12 is opened.

If the setting member 5 is defective, so that it no longer returns into its idle position despite the fact that the gas pedal 1 is in the idle position, then the setting-member contact 12 remains open. Actuation of the fuel-pump relay 8 is then again possible only via the second branch 13 of the parallel circuit 9, provided that the gas pedal 1 is moved out of its idle position and the pedal contact 14 is thus closed.

If the gas pedal 1 moves out of its idle position without the gas pedal 1 being actuated by the driver, for instance due to the breaking of the compression spring 19, then the second branch 13 of the parallel circuit 9 also remains open, so that a dangerous, uncontrollable driving situation cannot occur.

The pedal contact 14 is applied in its closing position by a spring 20. Furthermore there is a band 21, connected with its one end to one pedal part 16 and its other end to the pedal contact 14. The length of the band 21 is a little bit shorter than the distance of its two fastening points if pedal contact 14 is in its closed position and pedal part 16 is in its not actuated position so that in the not actuated position of the gas pedal 1 the pedal contact 14 is opened by the band 21 against the force of spring 20.

I claim:

1. In a device for electrically controlling the speed of travel of an automotive vehicle, having a desired-value transmitter, which can be displaced by a gas pedal and whose output signal can act on a setting member of an element which controls the fuel-air mixture of an internal combustion engine and having a pedal contact which can be acted on by the gas pedal in such a manner that when the gas pedal is moved out of the idling position, energy can be supplied to a unit which controls the speed of rotation of the motor, the improvement comprising means for sensing an application of an outside force against said gas pedal including, a safety contact closable only by mechanical actuation of the gas pedal out of its idle position by said force, said safety contact being arranged in series with the pedal contact.

2. The device according to claim 1, wherein said safety contact 15 is closable against a predetermined spring force.

3. The device according to claim 1, wherein said safety contact is located in the gas pedal.

4. The device according to claim 1, wherein said pedal contact and said safety contact are connected in a line which couples a source of current to the ignition circuit.

5. The device according to claim 1, wherein said pedal contact and said safety contact are connected in a line which couples a source of current to a fuel pump.

6. The device according to claim 5, wherein said pedal contact and said safety contact are connected in a line which couples a source of current to said fuel pump and to the ignition circuit.

7. In a device for electrically controlling the speed of travel of an automotive vehicle, having a desired-value transmitter, which can be displaced by a gas pedal and whose output signal can act on a setting member of an element which controls the fuel-air mixture of an internal combustion engine and having a pedal contact which can be acted on by the gas pedal in such a manner that when the gas pedal is moved out of the idling position, energy can be supplied to a unit which controls the speed of rotation of the motor, the improvement comprising a safety contact closable by mechanical actuation of the gas pedal out of its idle position, said safety contact being arranged in series with the pedal contact, a setting-member contact which is closed in the idle position of the element controlling the fuel-air mixture and is open in the gas position of said element is arranged in parallel to the series connection of the pedal contact and the safety contact.

8. In a device for electrically controlling the speed of travel of an automotive vehicle, having a desired-value transmitter, which can be displaced by a gas pedal and whose output signal can act on a setting member of an element which controls the fuel-air mixture of an internal combustion engine and having a pedal contact which can be acted on by the gas pedal in such a manner that when the gas pedal is moved out of the idling position, energy can be supplied to a unit which controls the speed of rotation of the motor, the improvement comprising a safety contact closable by mechanical actuation of the gas pedal out of its idle position, said safety contact being arranged in series with the pedal contact, said safety contact is located in the gas pedal, said gas pedal comprises two pedal parts which are swingable relative to each other against a spring force, said safety contact comprising contacts positioned in respective ones of said pedal parts, and wherein said contacts are conductively connectable to each other upon relative movement of said pedal parts towards each other, overcoming the spring force.

* * * * *